(12) United States Patent
Ussing (10) Patent No.: US 9,242,408 B2
(45) Date of Patent: Jan. 26, 2016

(54) METHOD OF PRODUCING A STRUCTURE COMPRISING A NANOSTRUCTURE

(75) Inventor: Tomas Ussing, Frederiksberg (DK)

(73) Assignee: Fluidmedix ApS, Taastrup (DK)

( * ) Notice: Subject to any disclaimer, the term of this patent is extended or adjusted under 35 U.S.C. 154(b) by 834 days.

(21) Appl. No.: 13/514,735

(22) PCT Filed: Dec. 9, 2010

(86) PCT No.: PCT/EP2010/069253
§ 371 (c)(1),
(2), (4) Date: Sep. 4, 2012

(87) PCT Pub. No.: WO2011/070102
PCT Pub. Date: Jun. 16, 2011

(65) Prior Publication Data
US 2013/0001826 A1    Jan. 3, 2013

(30) Foreign Application Priority Data
Dec. 9, 2009  (DK) ................................ 2009 01298

(51) Int. Cl.
*B29C 59/02* (2006.01)
(52) U.S. Cl.
CPC ............. *B29C 59/022* (2013.01); *B29C 59/026* (2013.01); *B29C 2059/023* (2013.01)
(58) Field of Classification Search
CPC ................ B29C 59/022; B29C 59/026; B29C 2059/023
See application file for complete search history.

(56) References Cited

U.S. PATENT DOCUMENTS

| 5,670,003 A | 9/1997 | Boswell et al. |
| 5,693,405 A | 12/1997 | Harvie et al. |
| 2004/0207892 A1* | 10/2004 | Menz et al. ................. 359/2 |
| 2008/0145568 A1 | 6/2008 | Lee et al. |
| 2009/0080323 A1 | 3/2009 | Cavallini et al. |

FOREIGN PATENT DOCUMENTS

| DE | 20111350 | 10/2001 |
| EP | 0537455 | 4/1993 |
| GB | 1226641 | 3/1971 |
| GB | 2333995 | 8/1999 |
| WO | 01/32760 | 5/2001 |
| WO | 2005/037528 | 4/2005 |
| WO | 2011/070102 | 6/2011 |

OTHER PUBLICATIONS

PCT/EP2004/009712 International Search Report dated Apr. 28, 2005 (10 pages).

* cited by examiner

*Primary Examiner* — Alison Hindenlang
(74) *Attorney, Agent, or Firm* — Lisa V. Mueller; Todd S. Hofmeister; Michael Best & Friedrich LLP (57) ABSTRACT

The invention relates to a method by which a structure, e.g. a microstructure, is formed into a surface comprising a nanostructure during the fabrication of the structure. The method of fabrication of the structure is preferably embossing, and the invention thus describes methods by which a nanostructure is protected from being destroyed by the embossing process.

26 Claims, 4 Drawing Sheets

METHOD OF PRODUCING A STRUCTURE COMPRISING A NANOSTRUCTURE

CROSS-REFERENCE TO RELATED APPLICATIONS

This is the U.S. national stage entry of International Patent Application No. PCT/EP2010/069253, filed on Dec. 9, 2010, which claims priority to Danish Patent Application No. PA 2009 01298, filed on Dec. 9, 2009, the contents of all of which are herein fully incorporated by reference.

FIELD OF THE INVENTION

The invention relates to a method by which a structure, e.g. a microstructure, is formed into a surface comprising a nanostructure during the fabrication of the structure. The method of fabrication of the structure is preferably embossing, and the invention thus describes methods by which a nanostructure is protected from being destroyed by the embossing process.

BACKGROUND

In the fields of micro- and nano-fabrication it is often advantageous to be able to fabricate in both the micro- and the nano-scale. A microstructural element may, for its intended function, benefit from having a nanostructured surface. For example, nanostructures providing an increased effective surface area are useful for increasing the contact area between a liquid and the surface of a solid material and may be used to facilitate capillary flow through a microfluidic system. However, fabrication processes are often optimized for either the nanoscale or the microscale. It will often be required to apply one process for the nanofabrication process and then another for the microfabrication, and such processes are often very difficult to combine.

Embossing is a frequently used technique for producing microstructures or nanostructures. For example, an embossing tool for producing a given microstructure may be milled in a durable metal with milling tools that will be minimum ~20 μm in width, whereas a given nanostructure that may be desired to embed into the surface of said microstructure may only be achieved through an embossing tooling process involving for instance UV-lithography followed by chemical etching or direct e-beam writing.

SUMMARY OF THE INVENTION

It is an object of the invention to provide economically feasible methods by which a nanostructure, e.g. a bulk nanostructure, is protected from being affected by a microstructuring fabrication process.

The present inventor has developed a new approach to the production of microstructures comprising nanostructures. The method is based on protecting a nanostructure, which forms part of the surface of a substrate, with a sacrificial surface layer, and embossing the microstructure into the part of the substrate which contains the protected nanostructure. Once the embossing tool has been removed from the substrate the sacrificial surface layer may be removed as well. The sacrificial surface layer stabilises the nanostructure during the embossing step and leaves at least a part of the nanostructure substantially unaltered on the surface of the microstructure.

Thus, an aspect of the invention pertains to a method of producing a structure comprising a nanostructure, the method comprising the steps of:

a) providing a substrate comprising a surface, said surface comprising a nanostructure
b) applying a sacrificial surface layer to the surface comprising the nanostructure so as to at least partially cover the nanostructure,
c) embossing a structure into said surface, which structure is at least partially superimposed into the covered nanostructure,
d) optionally, removing the sacrificial surface layer from the structure, thus revealing the nanostructure in a surface of the structure.

BRIEF DESCRIPTION OF THE FIGURES

FIG. 1.a shows a cross section of the substrate comprising a surface, said surface comprising a nanostructure.

FIG. 1.b shows the surface of the substrate (2) being coated with the sacrificial surface layer (3).

FIG. 2.a shows the substrate (1) with the surface comprising a nanostructure (2) and the sacrificial surface layer (3).

FIG. 2.b shows the embossing process in that the embossing tool (4) with the inverted microstructure (5) has been pressed into the substrate (1).

FIG. 2.c shows the substrate (1) after the embossing tool (4) has been extracted.

FIG. 2.d shows the removal of the sacrificial surface (3) layer by rinsing the surface with a suitable solvent (6).

FIG. 2.e shows an alternative method of removing the sacrificial surface layer.

DETAILED DESCRIPTION OF THE INVENTION

The structure is preferably a structure formed in the surface of the substrate, and may have a wide range of sizes and shapes. In a preferred embodiment of the invention the structure is a microstructure.

In the context of the present invention, the term "microstructure" relates to a structure which comprises at least on dimension in the range of at least one dimension in the range of 1-1000 μm.

The microstructure may e.g. comprise micro channels and/or micro reservoirs in wide range of different shapes and sizes. A microstructural element may e.g. have the size of from 1 μm to 10 mm. E.g. a microstructure may comprise a cell filter that will separate leukocytes from erythrocytes that has a width of 2 μm and a depth of 1 μm; it may comprise a channel structure with channels that are 100 μm wide and 25 μm deep, and it may additionally comprise a circular sample inlet chamber that is 5 mm in diameter and 500 μm deep. In a preferred embodiment the embossing process will form all of the above mentioned elements in one single process.

In the context of the present invention, the term "nanostructure" relates to a structure which comprises at least on dimension in the range of at least one dimension in the range of 1-5000 nm. A nanostructure may comprise one or more small structure(s) recessed into and/or protruding out from a surface. Examples of nanostructures recessed into a surface are e.g. nano grooves, nano channels, or nano chambers. Examples of nanostructures protruding from the surface are nano pillars, nano walls, or nano bumps.

Prior to the embossing step, a protruding nanostructure typically has a height relative to the surface of the substrate of at most 5 micron, such as at most 1 micron or at most 500 nm. The protruding nanostructure may for example have a height relative to the surface in the range of 1 nm-5 micron, preferably in the range 10 nm-1 micron, and even more preferably in the range 50 nm-500 nm.

Prior to the embossing step, a recessed nanostructure typically has a depth relative to the surface of the substrate of at most 5 micron, such as at most 1 micron or at most 500 nm. The recessed nanostructure may for example have a depth relative to the surface in the range of 1 nm-5 micron, preferably in the range of 10 nm-1 micron, and even more preferably in the range of 50 nm-500 nm.

The nano grooves or protrusions may have a substantially symmetric aspect ratio such as e.g. a groove having a width of 250 nm and a depth of 250 nm or they may have an asymmetric aspect ratio such as e.g. a circular protrusion having a diameter of 5 µm and a height of 50 nm.

In a preferred embodiment the nanostructure, e.g. comprising a number of grooves or protrusions, covers an substantial area of a surface of the substrate. They may be repeated with a defined positional relationship between one another e.g. using photolithography or they may be placed in a random pattern e.g. from being formed by a grinding tool, grinding paper or a sandblasting process.

The nanostructure may add one or more extra functionalities to the surface comprising it. The nanostructure may for example increase the effective surface-area of the surface. An increased effective surface-area may for example increase the impact of the surface on a liquid which is contacting it.

Additionally, or alternatively, the nanostructure may provide a catalytic effect based on specific geometric structures that may have an influence in the molecular scale on e.g. proteins.

Additionally, or alternatively, the nanostructure may be able to specifically capture a certain molecule or a group of molecules. The nanostructure may for example be a molecular imprint, e.g in a surface of the substrate. Any known technique for molecular imprinting may be used to form the nanostructure, such as the one described in the international patent application WO 01/32,760, which is incorporated herein by reference for all purposes.

The nanostructure may be a sensor or part of a sensor system, such as e.g. a SAW (Surface Acoustic Wave)-sensor or a micro-cantilever sensor.

The substrate in which the structure is form can have any suitable size and shape. It is, however, preferred that the substrate has sufficient softness and/or ductility to be embossable. The substrate may for example be softened by heating prior to the embossing step, it may be softened using a chemical agent (e.g. a solvent), it may be softened by surface radiation (e.g. Excimer laser) or a combination of softening by chemical and/or heat and/or radiation may be applied.

In an embodiment of the invention the substrate is a substantially flat slab, e.g the size of a microscope slide. In another embodiment of the invention the substrate is in the form of a continuous roll of substrate.

The substrate may essentially consist of a single material, or comprise several different materials. In an embodiment of the invention the substrate is a polymer; preferably a thermopolymer. In a preferred embodiment the thermopolymer is PETG (Polyethylene Terephthalate Glycol). In the context of the present invention the term "thermopolymer" is used as a synonym for "thermoplastic polymer".

The structuring process is an embossing process in where a negative representation of the structure—an embossing tool—is forced into the surface of a material of a softer composition than that of the tool. The embossing tool comprises protruding parts that that will form a structure into a surface upon embossing.

Processing by embossing is generally well-known to the person skilled in the art and for example described in Worgull ("Hot Embossing—Theory and Technology of Microreplication", Matthias Worgull, Elsevier, ISBN 13: 978-0-8155-1579-1), which is incorporated herein by reference for all purposes.

In a preferred embodiment the embossing process is a hot-embossing process, wherein the substrate is heated to a temperature close to and preferably above the glass transition temperature of the substrate.

In the preferred embodiment, the invention relates to a method of producing a microfluidic microsystem; the microfluidic system may be applied for analytical purposes such as e.g. a bioanalytical system. In this case the microstructure may comprise one or more micro channels and/or one or more micro reservoirs. The nanostructure for a microfluidic system could for example comprise an increased nano-scale surface roughness inside the one or more microchannel(s).

The sacrificial surface layer preferably fills the voids of the nanostructure such that it will at least extend up to the highest structural part of the nanostructures. In a preferred embodiment the sacrificial surface layer extends above the highest structural part of the nanostructures.

In an embodiment of the invention, the sacrificial surface layer extends at most 10 µm above the highest point of the nanostructure, preferably at most 5 µm, and even more preferably at most 2 µm above the highest point of a nanostructure. For example, the sacrificial surface layer may extend at most 1 µm above the highest point of a nanostructure, preferably at most 0.5 µm, and even more preferably at most 0.2 µm above the highest point of the nanostructure.

In yet an embodiment of the invention, the top of the sacrificial surface layer is approximately at the same level as the highest point of the nanostructure, e.g. barely covering the nanostructure.

In the event that the embossing process is a hot-embossing process, the sacrificial surface layer shall be chosen so that it will sustain the temperature to which the embossed substrate and the hot-embossing tool are heated.

In a preferred embodiment of the invention the sacrificial surface layer is substantially incompressible, meaning that its volume is reduced at most 50% (vol/vol) by the embossing step relative to the volume of the uncompressed sacrificial surface layer. For example, the volume of the sacrificial surface layer may be reduced at most 30% (vol/vol) during the embossing step relative to the volume of the uncompressed sacrificial surface layer, preferably at most 20% (vol/vol), and even more preferred at most 10% (vol/vol) during the embossing step relative to the volume of the uncompressed sacrificial surface layer.

Even lower compressibilities may be preferred, and in an embodiment of the invention, the volume of the sacrificial surface layer is reduced at most 2% (vol/vol) during the embossing step relative to the volume of the uncompressed sacrificial surface layer, preferably at most 1% (vol/vol), and even more preferred at most 0.1% (vol/vol) during the embossing step relative to the volume of the uncompressed sacrificial surface layer.

The present inventor has found that reducing the compressibility of the sacrificial surface layers surprisingly results in better control and precision of structure formed during the embossing step.

In a preferred embodiment of the invention the sacrificial surface layer comprises a salt that will fill the voids of the nanostructure (e.g. a tris-borate acid salt). The salt may, prior to application, be dissolved in a suitable solvent—e.g. water. The solution will be applied to the surface of the nanostructured substrate, whereafter the solvent will be evaporated into the surrounding air, thus leaving the crystallized salt layer into and onto the nanostructured substrate. In order to enhance the even distribution of the salt solution in an adequately thin layer an organic solvent may be added to the solution. The organic solvent may additionally enhance the evaporation of the primary solvent. The organic solvent is preferably chosen so as to be compatible with the nanostructured substrate so that it will not alter the surface of the substrate (i.e. dissolve and destroy the nanostructure). Ethanol and methanol has proved to possess attractive properties for this purpose: they will provide an increased spreading of the solution (e.g. salt dissolved in water, diluted with organic solvent) and they will enhance the removal (evaporation) of the primary solvent. However a specific polymer may be resistant to harsher organic solvents that may then be used should they exhibit advantageous properties, e.g. Cyclic Olefin Copolymer—COC—and acetone.

In a preferred embodiment there will be a substantial overweight of organic solvent such as e.g. 10% water-salt solution in 90% organic solvent, but it is understood that specific and advantageous properties may be achieved using a different ratio such as e.g. the water-salt solution comprising between 0.1% and 9.9% of the combined volume, the remaining volume comprising the organic solvent. A lower than 10% water-salt solution will produce a thinner sacrificial salt layer, whereas a water-salt concentration above 10% will produce a thicker sacrificial salt layer (e.g. between 10.1% and 25% water-salt or between 25.1% and 99% water-salt); it is well understood that the advantages that the invention presents, is not limited to being achieved with a specific mixture of components (salt, primary solvent and organic solvent)

All percentages mentioned herein are volume/volume unless it is stated otherwise.

Figure 1A:
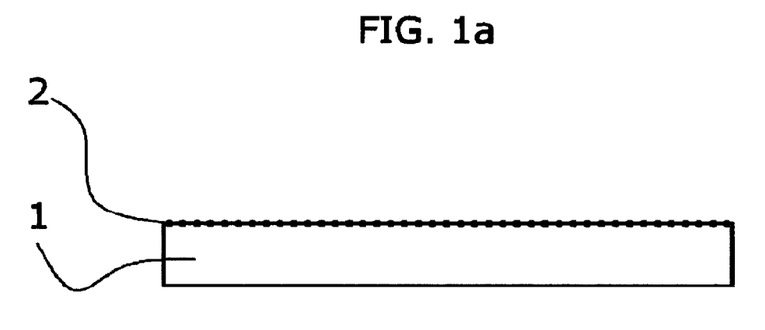
Figure 1B:
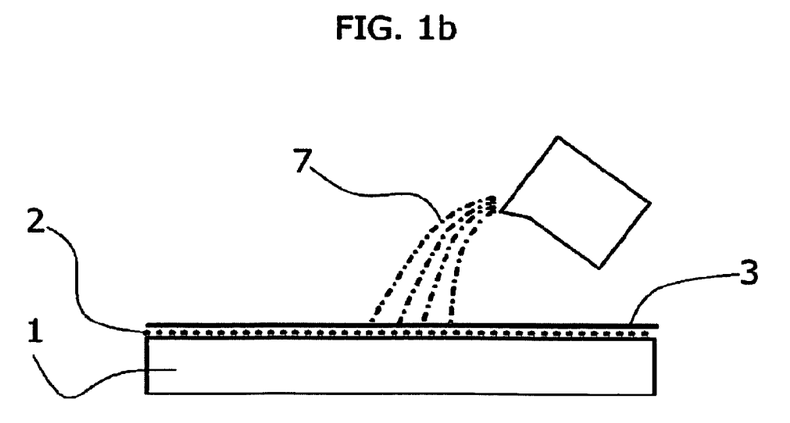
Figure 2A:
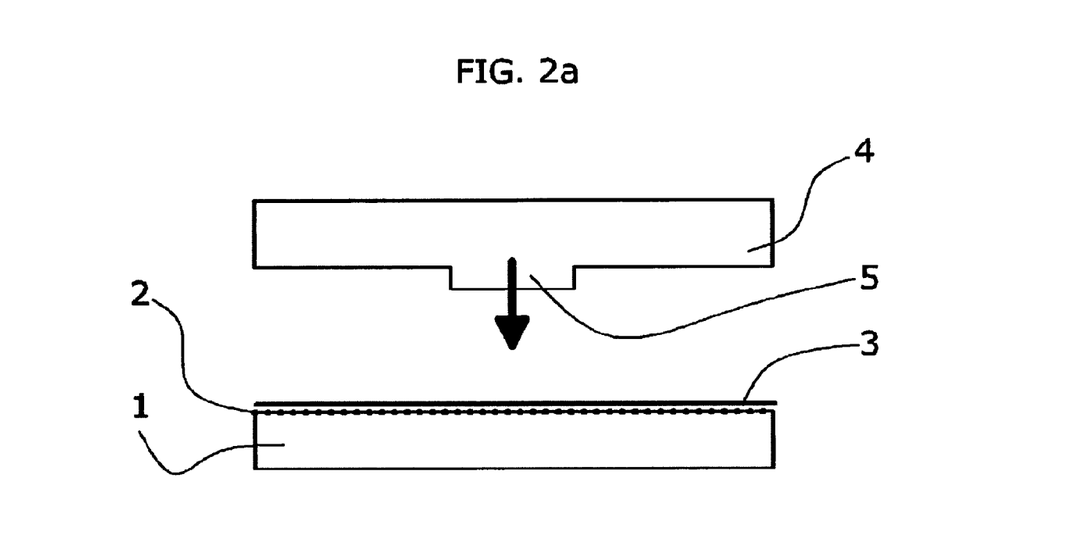
Figure 2B:
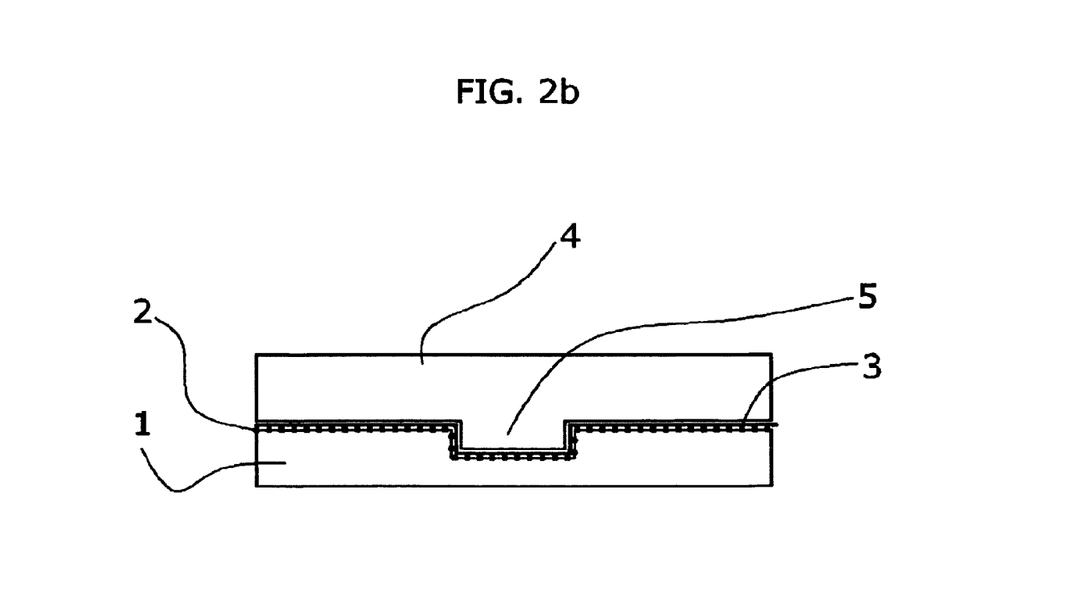
Figure 2C:
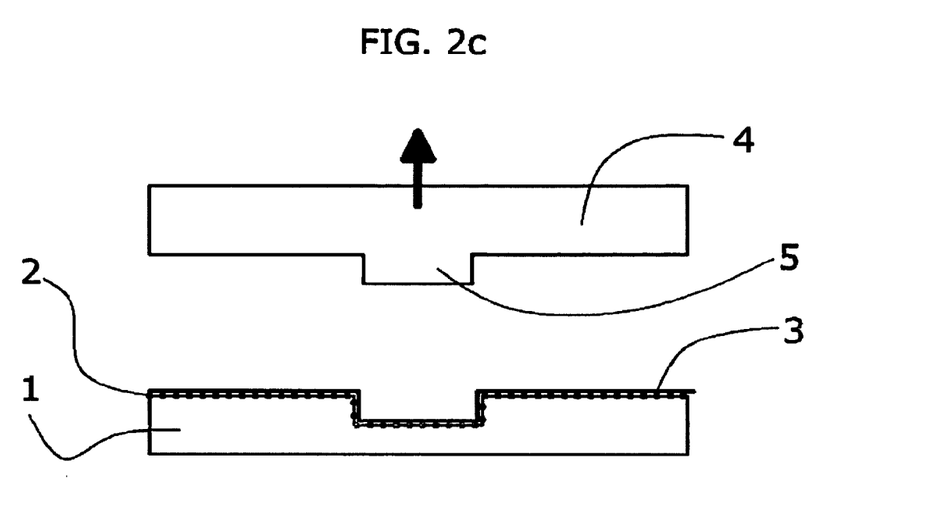
Figure 2D:
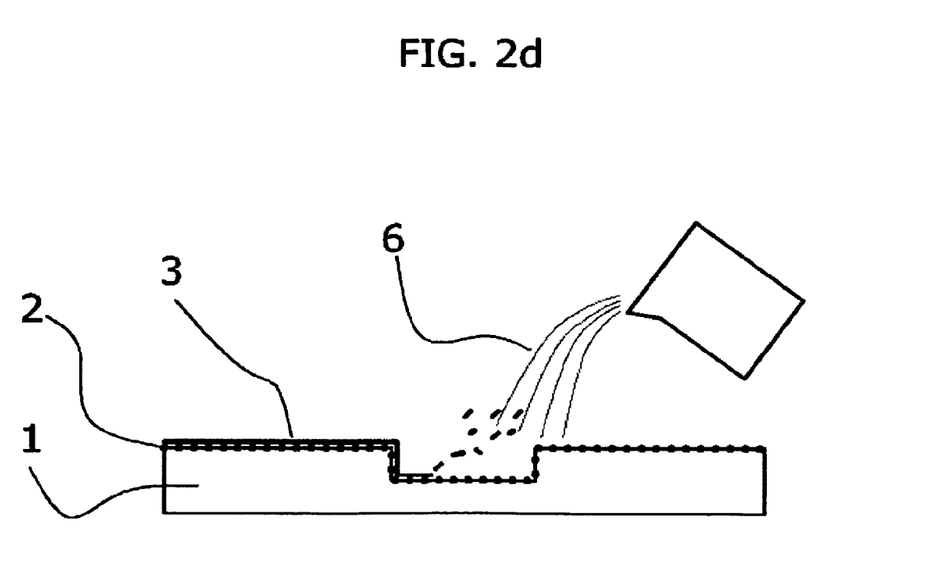
Figure 2E:
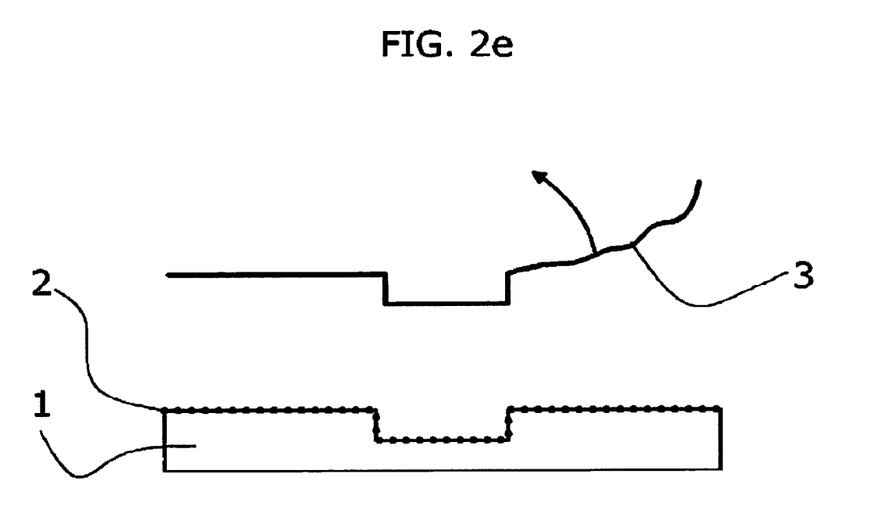

The dissolved sacrificial surface layer, preferably additionally comprising an organic solvent, may be poured onto the nanostructured surface as depicted in FIG. 1.b. The solution may be encouraged to spread out to cover a certain area by means of a spreading tool or by being affected by shaking or tapping or it may just spread out to cover a certain area, the area thus being defined by the viscosity of the solution in combination with the wettability of the nanostructured surface by the composition of the solution. The solution may also be sprayed or it may be spin-coated onto the nanostructured surface. The nanostructured surface may be covered completely prior to the embossing process or it may be only partially covered. One method of only partially covering the nanostructure with the sacrificial surface layer may be a) covering the full nanostructured area in a bulk process and b) masking part of the bulk covered area (e.g. by a protective film) and c) removing the sacrificial surface layer by a suitable process from the unmasked areas (e.g. by rinsing in a suitable solvent) and d) removing the mask prior to embossing.

After the completion of the embossing process the sacrificial surface layer is removed whereafter it will reveal the nanostructure that was being protected from deformation during the embossing process. The removal may be either full or partial and the removal (full or partial) may not take place until the fabricated microstructure is utilized in its intended function. E.g. the sacrificial surface layer may be either hydrophilic or hydrophobic and may as such—if left on the surface of the microstructure—influence the wettability of said fully or partially covered surface.

In a preferred embodiment the removal of the sacrificial surface layer is realized by the rinsing with a suitable solvent; this removal process is depicted in FIG. 2.d. Depending on the durability and composition of the sacrificial surface layer it may also, as shown in FIG. 2.e, be removed by peeling; additionally the sacrificial surface layer, may be removed by applying ultrasound, the ultrasound frequency thus being chosen so as to excite the sacrificial surface layer. The ultrasound removal method may include a pressurized air step blowing away debris and fragments.

FIG. 1.a shows a cross section of the substrate comprising a surface, said surface comprising a nanostructure. The substrate (1) comprise a surface comprising one or more nanostructure(s) (2)

FIG. 1.b shows the surface of the substrate (2) being coated with the sacrificial surface layer (3). The dissolved sacrificial surface layer material (7) is applied onto the surface (2) after which the solvent will evaporate and thus leave the solid sacrificial surface layer (3) onto the surface and into the voids of the surface comprising the nanostructure (2).

FIG. 2.a shows the substrate (1) with the surface comprising a nanostructure (2) and the sacrificial surface layer (3). Additionally an embossing tool (4) is shown with the inverted microstructure part (5).

FIG. 2.b shows the embossing process in that the embossing tool (4) with the inverted microstructure (5) has been pressed into the substrate (1). The nanostructured surface (2) and the sacrificial surface layer (3) is maintained as part of the surface of the substrate(1)

FIG. 2.c shows the substrate (1) after the embossing tool (4) has been extracted. The microstructure has now been formed into the surface and the nanostructure (2) is intact on the bulk surface as well as in the microstructure, still being protected by the sacrificial surface layer (3)

FIG. 2.d shows the removal of the sacrificial surface (3) layer by rinsing the surface with a suitable solvent (6). The nanostructured surface (2) now remains intact and exposed.

FIG. 2.e shows an alternative removal method, wherein the sacrificial surface layer has formed a rigid film layer (3) that can be peeled off by mechanical force.

Below a number of exemplary embodiments are described.

Exemplary embodiment 1: A method of superimposing a nanostructure into the surface of a microstructure, the method comprising the steps of:
 a) providing a nanostructured material, e.g. the above-mentioned substrate,
 b) applying a sacrificial surface layer capable of filling the voids making up said nanostructure,
 c) embossing a microstructure into said nanostructured material,
 d) removing said sacrificial surface layer, thus revealing the nanostructure in the surface of the microstructure.

Exemplary embodiment 2: The method according to exemplary embodiment 1, wherein the embossing process is a hot-embossing process.

Exemplary embodiment 3: The method according to any of the preceding exemplary embodiments, wherein the nanostructured material is a polymer.

Exemplary embodiment 4: The method according to exemplary embodiment 3, wherein the polymer is a thermopolymer.

Exemplary embodiment 5: The method according to any of the preceding exemplary embodiments, wherein the nanostructured material is PETG.

Exemplary embodiment 6: The method according to any of the preceding exemplary embodiments, wherein the sacrificial layer comprise a soluble solid.

Exemplary embodiment 7: The method according to exemplary embodiment 6, wherein the soluble solid is a salt.

Exemplary embodiment 8: The method according to exemplary embodiment 7, wherein the salt is Tris-Borate acid.

Exemplary embodiment 9: The method according to any of the exemplary embodiments 6, 7 or 8, wherein the soluble solid is applied in a dissolved liquid state whereafter the solvent is evaporated and the solid is solidified.

Exemplary embodiment 10: The method according to exemplary embodiment 9, wherein the solvent is water.

Exemplary embodiment 11: The method according to exemplary embodiment 10, wherein the dissolved liquid state additionally comprise an organic solvent.

Exemplary embodiment 12: The method according to exemplary embodiment 11, wherein the organic solvent is selected from the group of ethanol, methanol, acetone, toluene, MEK.

Exemplary embodiment 13: The method according to exemplary embodiment 11 or 12, wherein there is a substantially larger percentage of organic solvent in the dissolved liquid state, such as e.g. between 75% and 99.9% organic solvent or between 80% and 99% organic solvent or between 85% and 95% organic solvent, whereas the remaining volumetric percentage substantially comprise water and dissolved solid.

Exemplary embodiment 14: The method according to any of the exemplary embodiments 6-13, wherein the sacrificial layer is substantially in a saturated watery solution such as e.g. between 100% and 99% saturated or between 99% and 75% saturated or between 75% or 50% saturated solution.

Exemplary embodiment 15: The method according to any of the preceding exemplary embodiments, wherein the nanostructure comprise a wetting functionality.

Exemplary embodiment 16: The method according to any of the preceding exemplary embodiments, wherein the microstructure is a microfluidic structure.

Exemplary embodiment 17: The method according to any of the preceding exemplary embodiments, wherein the sacrificial surface layer is applied to only a selected part of the nanostructure leaving the remaining area unprotected from the effects of the embossing process.

Exemplary embodiment 18: The method according to any of the preceding exemplary embodiments, wherein the removal of the sacrificial surface layer is achieved during the final use of the microstructure.

Exemplary embodiment 19: The method according to any of the preceding exemplary embodiments, wherein only part of the sacrificial layer is removed after the embossing process Exemplary embodiment 20: The method according to any of the preceding exemplary embodiments, wherein the sacrificial surface layer is substantially hydrophilic.

Exemplary embodiment 21: The method according to any of the preceding exemplary embodiments, wherein the sacrificial surface layer is substantially hydrophobic.

The present invention has been described above with reference to specific embodiments. However, other embodiments than the above described are equally possible within the scope of the invention. The different features and steps of various embodiments and aspects of the invention may be combined in other combinations than those described herein.

EXAMPLES

Example 1

A piece of injection molded PETG (20×30×1½ mm) is nanostructured using a piece of "grain 4000" silicon carbide (SiC) sandpaper. The structural effect is verified as increasing the wettability of the surface in that the contact angle is increased from ~70 degrees in the pristine PETG surface to about ~40 degrees after being ground by the SiC sandpaper. A solution of 10% (volume) Tris-Borate buffer (3 M Tris and 3 M Borate acid) is mixed with 90% methanol. 25 µl of the solution is applied onto the nanostructured surface whereafter it is dispersed with a spatula so as to cover the entire surface (30×20 mm). The surface tension of the solution in combination with the PETG material will substantially keep the layer covering the entire area in an even thickness. Within minutes the water of the Tris-borate buffer and the methanol is evaporated and an even layer of Tris-Borate salt is now covering the nanostructured surface. The layer thickness was measured to ~400 nm using a Zygo™ surface profiler. The PETG piece was then placed in a hot-embossing device with a microchannel tool inserted. The tool and the PETG are heated to 95 degrees Celsius whereafter the tool is pressed into the surface of the PETG. The hot-embossing device is cooled to ambient temperature, the pressure is released and the tool is separated from the PETG. The PETG is rinsed in tap-water, thus removing the readily dissolvable Tris-borate salt. The microstructure is dried using compressed air and a lid is applied (a 40 µm thick hydrophobic cello tape) The design of the channel structure is such that it is dependent of the presence of the wetting nanostructure in order to be able to draw a well defined watery solution through the channels by capillary action. The correct filling of the channel structure is acknowledged and as such the survival of the nanostructure with the wetting property is verified.

Example 2

The nano structuring and the application of the sacrificial surface layer (Tris-borate salt) on a similar sized PETG were repeated as per the description in example 1. After the application of the sacrificial surface layer, half of the surface of the PETG was covered with a piece of cello tape (polypropylene tape comprising a pressure sensitive adhesive). The PETG was rinsed in tap water thus removing the unprotected half of the chip. The PETG was dried using compressed air, and the cello tape was removed. The PETG was now subjected to the hot-embossing process as described in example 1. The micro channel tool was positioned so that the first half of the micro structure would be embossed in the surface part that was still covered with the sacrificial surface layer, respectively the second half would be embossed directly into the exposed nanostructure. After repeating the deforming and rinsing steps and after applying the lid as explained in example 1, the micro channel structure was again subjected to the watery solution; the watery solution would now be drawn through the first half of the structure however the flow halted upon entering the second half, thus providing evidence that the nanostructure in the second half of the PETG did not survive the hot-embossing process.

The invention claimed is:

1. A method of producing a structure comprising a nanostructure, the method comprising the steps of:
   a) providing a substrate comprising a surface, said surface comprising a nanostructure
   b) applying a sacrificial surface layer to the surface comprising the nanostructure so as to at least partially cover the nanostructure,
   c) embossing a structure into said surface, which structure is at least partially superimposed into the covered nanostructure,
   d) optionally, removing the sacrificial surface layer from the structure, thus revealing the nanostructure in a surface of the structure.

2. The method of claim 1, wherein the embossing process is a hot embossing process.

3. The method of claim 1, wherein the substrate comprises a polymer.

4. The method of claim 3, wherein the polymer is a thermoplastic polymer.

5. The method of claim 4, wherein the polymer is Polyethylene Terephthalate Glycol.

6. The method of claim 1, wherein the structure is a microstructure.

7. The method of claim 6, wherein the microstructure comprises one or more microchannel(s) and/or one or more micro reservoir(s).

8. The method of claim 1, wherein the sacrificial surface layer comprises a soluble solid.

9. The method of claim 8, wherein the soluble solid is a salt.

10. The method of claim 9, wherein the salt is Tris-Borate acid.

11. The method of claim 8, wherein the soluble solid is applied in a dissolved liquid state whereafter the solvent is evaporated and the solid is solidified.

12. The method of claim 11, wherein the solvent is water.

13. The method of claim 12, wherein the dissolved liquid state additionally comprises an organic solvent.

14. The method of claim 13, wherein the organic solvent comprises one or more solvent(s) selected from the group consisting of ethanol, methanol, acetone, toluene, methyl ethyl ketone, and a mixture thereof.

15. The method of claim 13, wherein the percentage of organic solvent in the dissolved liquid state is between 75% and 99.9% organic solvent, whereas the remaining volumetric percentage substantially comprise water and dissolved solid.

16. The method of claim 13, wherein the percentage of organic solvent in the dissolved liquid state is between 80% and 99% organic solvent, whereas the remaining volumetric percentage substantially comprise water and dissolved solid.

17. The method of claim 13, wherein the percentage of organic solvent in the dissolved liquid state is between 85% and 95% organic solvent, whereas the remaining volumetric percentage substantially comprise water and dissolved solid.

18. The method of claim 8, wherein the sacrificial surface layer is substantially in a saturated watery solution which is between 100% and 99% saturated.

19. The method of claim 8, wherein the sacrificial surface layer is substantially in a saturated watery solution which is between 99% and 75% saturated.

20. The method of claim 8, wherein the sacrificial surface layer is substantially in a saturated watery solution which is between 75% and 50% saturated.

21. The method of claim 1, wherein the nanostructure comprises a nanostructure which increases the effective surface area of a surface of the substrate.

22. The method of claim 1, wherein the sacrificial surface layer is applied to only a selected part of the nanostructure leaving the remaining area unprotected from the effects of the embossing process.

23. The method of claim 22, wherein the removal of the sacrificial surface layer is achieved during the intended use of the microstructure.

24. The method of claim 23, wherein only part of the sacrificial surface layer is removed after the embossing process.

25. The method of claim 24, wherein the sacrificial surface layer is substantially hydrophilic.

26. The method of claim 24, wherein the sacrificial surface layer is substantially hydrophobic.

* * * * *

UNITED STATES PATENT AND TRADEMARK OFFICE
CERTIFICATE OF CORRECTION

PATENT NO. : 9,242,408 B2
APPLICATION NO. : 13/514735
DATED : January 26, 2016
INVENTOR(S) : Tomas Ussing It is certified that error appears in the above-identified patent and that said Letters Patent is hereby corrected as shown below:

ON THE TITLE PAGE,
    item (73) Assignee:

Please replace "Fluidmedix ApS" with -- Fluimedix ApS --

Signed and Sealed this
Twenty-third Day of August, 2016

Michelle K. Lee
*Director of the United States Patent and Trademark Office*